US007713016B2

(12) United States Patent
Angel

(10) Patent No.: US 7,713,016 B2
(45) Date of Patent: *May 11, 2010

(54) JOURNAL NOTEBOOK BINDING MACHINE

(76) Inventor: Felipe Angel, 25752 Dillon Rd., Laguna Hills, CA (US) 92653

( * ) Notice: Subject to any disclaimer, the term of this patent is extended or adjusted under 35 U.S.C. 154(b) by 0 days.

This patent is subject to a terminal disclaimer.

(21) Appl. No.: 12/157,699

(22) Filed: Jun. 12, 2008

(65) Prior Publication Data

US 2008/0250947 A1 Oct. 16, 2008

Related U.S. Application Data

(63) Continuation of application No. 11/490,571, filed on Jul. 21, 2006, now Pat. No. 7,441,488.

(51) Int. Cl.

| | |
|---|---|
| ***B42B 5/00*** | (2006.01) |
| ***B42C 9/00*** | (2006.01) |
| ***B42B 5/08*** | (2006.01) |
| ***B42B 9/00*** | (2006.01) |
| ***B42D 1/00*** | (2006.01) |
| ***G06K 1/00*** | (2006.01) |
| ***B23Q 15/00*** | (2006.01) |
| ***B26D 5/00*** | (2006.01) |

(52) U.S. Cl. .................. 412/33; 412/6; 412/7; 412/16; 412/20; 412/40; 281/21.1; 234/1; 234/2; 83/73; 83/358

(58) Field of Classification Search .................. 37/443; 83/35, 39, 73, 76.7, 76.9, 213, 240, 248, 83/255, 358, 359, 368, 527, 530, 550, 551, 83/553, 620, 622, 682, 688, 691; 234/1, 234/2, 3, 4, 95; 281/21.1, 29, 38; 412/8, 412/16, 20, 33, 37, 40; *B26D 05/08, 07/26; B26F 01/02, B26F 01/04; B42B 05/00, 05/10; B42C 05/00; B42D 01/00; E02F 03/28, 03/32, 09/08; H05K 03/00*

See application file for complete search history.

(56) References Cited

U.S. PATENT DOCUMENTS

| | | | | |
|---|---|---|---|---|
| 1,483,661 | A * | 2/1924 | Hall | 30/445 |
| 4,713,995 | A | 12/1987 | Davi | |
| 5,183,361 | A * | 2/1993 | Ho | 412/16 |
| 6,074,151 | A | 6/2000 | Pas | |
| 6,079,924 | A | 6/2000 | Chiang | |
| 6,186,720 | B1 | 2/2001 | Chiang | |
| 6,877,408 | B2 * | 4/2005 | Kubota et al. | 83/35 |
| 2005/0262741 | A1 * | 12/2005 | Bietz | 37/443 |

* cited by examiner

*Primary Examiner*—Dana Ross
*Assistant Examiner*—Justin V Lewis
(74) *Attorney, Agent, or Firm*—Vic Lin; Myers Andras Sherman LLP

(57) ABSTRACT

A dual function binding machine for making journal notebooks at home includes a hole punching mechanism and a binding mechanism. A punch die includes a plurality of rectangular punch teeth in a graduated configuration to minimize the amount of force required to penetrate through the journal book materials. A guide provides different positions for punching through covers, inner pages and continuous punching of both. This allows the perfect alignment and fit of the outside covers with the inside pages. A spring biased lever operates the punch die in a horizontal direction. The binding mechanism included in the same machine has a vertical outer vise wall that is horizontally movable to compress the binding material to the pages and covers of the journal notebook.

26 Claims, 10 Drawing Sheets

JOURNAL NOTEBOOK BINDING MACHINE

This is a continuation application of application Ser. No. 11/490,571 filed on Jul. 21, 2006.

BACKGROUND OF THE INVENTION

1. Field of the Invention

The present invention relates generally to a binding machine for journal notebooks.

2. Description of Prior Art and Related Information

In the scrapbook and arts-and-crafts industries, a great demand exists for do-it-yourself projects and the tools that enable such hobbyists to accomplish those projects. The growing trend is to enable do-it-yourselfers to make customized products at home that would otherwise be mass produced and available for sale only at commercial retail stores such as greeting cards and the like.

Certain projects, such as creating and customizing greeting cards, lend themselves more easily to the arts-and-crafts arena because few special tools are required. Other products, however, are very difficult to transition to the do-it-yourself industry because of certain machinery that may be required to manufacture the products or components thereof. Accordingly, many potential do-it-yourself projects are currently non-existent due to the absence of the appropriate tools to enable individuals to work in the comfort of their own homes.

This is true for making bound journal notebooks. While journal notebooks may come in a variety of different sizes and designs, they typically include a front cover, a back cover, and a plurality of pages in between, all of which are bound together by double wire binding ring combs or some other type of binder. And, though industrially manufactured journal notebooks are widely offered for sale through bookstores, gift shops and other commercial outlets, there is a need to make the craft of journal notebook assembling available to individuals. The popularity of journal notebooks as great gift ideas and the potential to individualize such notebooks to express one's own tastes and preferences make journal notebooks a terrific candidate for a do-it-yourself project which, until now, has not been made available.

Accordingly, a great demand exists for the appropriate tools to enable individuals to make his or her own homemade journal notebooks. However, many manufacturing challenges have prevented the transition of journal notebook making from the factory to the home. For example, journal notebooks require a plurality of holes that must be punched at precise locations on each page of a particular notebook. Without such consistency of the hole positions on every page, the pages will not be neatly aligned once bound. While single hole punches are known, such conventional tools are impractical both in the tediousness of the task, and the inability of such tools to provide consistent positioning of the individually punched holes on every page.

Furthermore, the covers of the journal notebooks tend to be composed of thick, heavy duty materials, such as chipboard, card stock and other such materials which would make the physical act of punching the holes through the covers a very challenging task with conventional tools.

SUMMARY OF THE INVENTION

The present invention provides structures and methods which overcome the deficiencies in the prior art.

In one aspect, a journal notebook binding apparatus is provided and adapted for non-industrial use. The apparatus comprises a hole punching mechanism having a plurality of punch teeth, and an actuator to move the punch teeth. A dual function apparatus also comprises a binding mechanism that includes a horizontally movable vise wall. A handle may be coupled to the horizontally movable vise wall.

Each tooth preferably comprises a rectangular profile. The actuator moves the punch teeth in a substantially horizontal direction. The actuator may comprise a lever biased to an open top position. The plurality of punch teeth are included in a punch die in a graduated configuration.

The apparatus further comprises a guide that provides a first position for punching inner pages and a second position for punching outer covers. The guide preferably comprises a third position for continuous punching of both outer covers and inner pages. For extra stability and leverage, the apparatus may also include a stabilizer extension arm that can be slid out from the rear of the machine.

In another aspect, a journal book binding apparatus adapted for non-industrial use is provided with a small compact overall size. The apparatus has a width of less than 12 inches and a length of less than 10 inches. The apparatus comprises a hole punching mechanism, a guide for positioning journal book materials to be punched, and a binding mechanism. The hole punching mechanism includes a main casing having a height less than 8 inches, a plurality of punch teeth, and an actuator to move the punch teeth. The binding mechanism including a horizontally movable vise wall.

The guide is configured to provide a first position, a second position and a third position for the objects to be punched. The actuator moves the punch teeth in a substantially horizontal direction. Each tooth preferably comprises a rectangular profile. The plurality of punch teeth are included in a punch die in a graduated configuration.

The hole punching mechanism comprises a manual lever for moving the plurality of punch teeth. The hole punching mechanism is adapted to penetrate the journal book materials with manual force applied to the lever in the range of 0.5 pounds to 25 pounds. A stabilizer extension arm may be included.

In a further aspect, a method is provided for making a journal notebook at home with a single machine. The method comprises providing at least one cover and at least one page, punching a first plurality holes in the at least one cover with the machine, punching a second plurality of holes in the at least one page that align with the first plurality of holes in the at least one page with the machine, inserting a binding material through the first plurality of holes and the second plurality of holes, and compressing the binding material with the machine.

The step of punching the first plurality holes in the at least one cover comprises horizontally punching the first plurality holes in the at least one cover. The step of punching the second plurality of holes in the at least one page that align with the first plurality of holes in the at least one page comprises horizontally punching the second plurality of holes in the at least one page.

The step of compressing the binding material comprises moving a vise wall horizontally. The step of punching the first plurality holes in the at least one cover comprises manually pushing a lever with a force between 5 pounds and 25 pounds. The step of punching the second plurality of holes in the at least one page that align with the first plurality of holes in the at least one page comprises manually pushing a lever with a force between 1 pound and 5 pounds.

Where the first plurality of holes comprise a first pattern, the method further comprises punching a third plurality of holes in the at least one cover that is consistent with the first pattern. Where the second plurality of holes comprise a first pattern, the method further comprises punching a third plurality of holes in the at least one page that is consistent with the first pattern.

In summary, a dual function binding machine for making journal notebooks at home includes a hole punching mechanism and a binding mechanism. A punch die includes a plurality of rectangular punch teeth in a graduated configuration to minimize the amount of force required to penetrate through the journal book materials. A guide provides different positions for punching through covers, inner pages and continuous punching of both. This allows the perfect alignment and fit of the outside covers with the inside pages. A spring biased lever operates the punch die in a horizontal direction. The binding mechanism included in the same machine has a vertical outer vise wall that is horizontally movable to compress the binding material, such as double wire binding ring combs, to the pages and covers of the journal notebook.

The invention, now having been briefly summarized, may be better appreciated by the following detailed description.

DETAILED DESCRIPTION OF THE PREFERRED EMBODIMENTS

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

Figure 1:
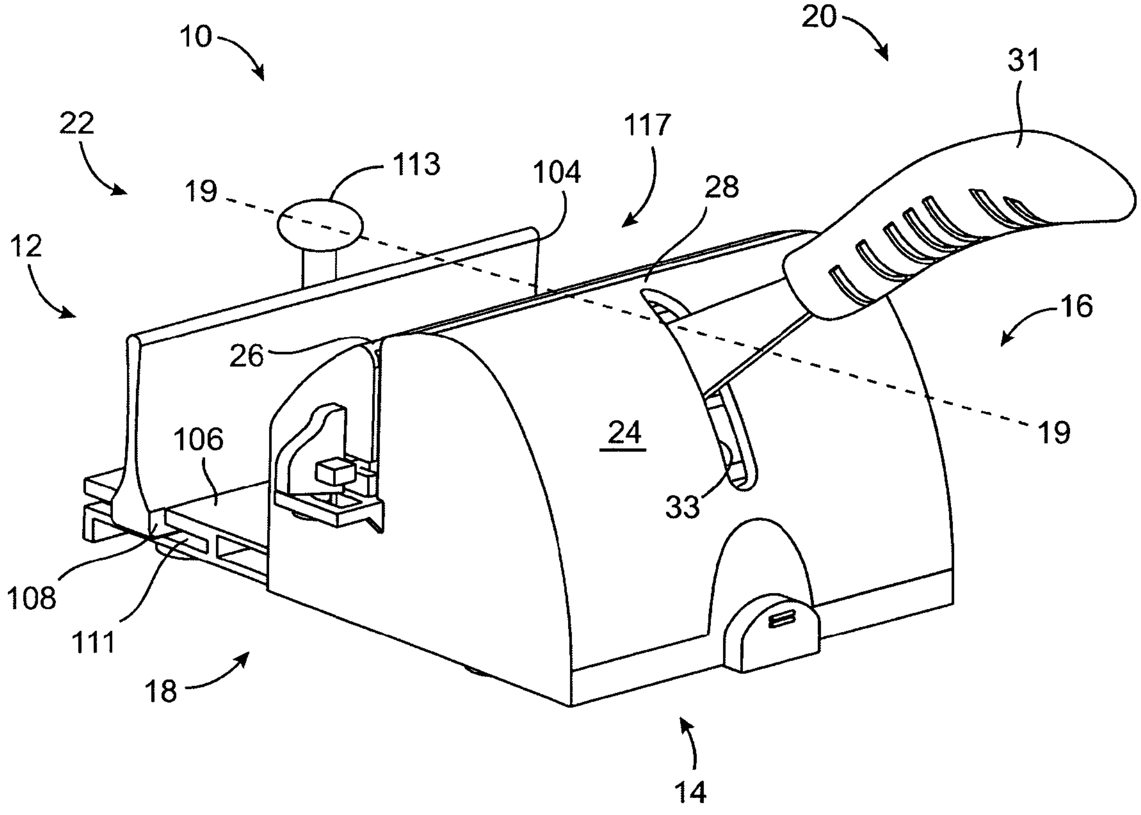
FIG. 1 is a rear perspective view of a preferred embodiment of a journal notebook binding apparatus.

FIG. 1 is a perspective view of a preferred embodiment of a journal book binding machine, or apparatus, 10. The apparatus 10 is preferably adapted for non-industrial use, particularly, for individuals to use at home or wherever convenient, as opposed to an industrial, heavy duty machinery typically deployed at a manufacturing or assembly plant. As discussed further below, the relatively small size of the apparatus 10 makes it easily portable and convenient for storing or transporting to a desired location.

While the dual function apparatus 10 is useful for making all types of bound books, the preferred embodiment of the apparatus 10 is particularly useful for making bound journal notebooks.

Figure 2:
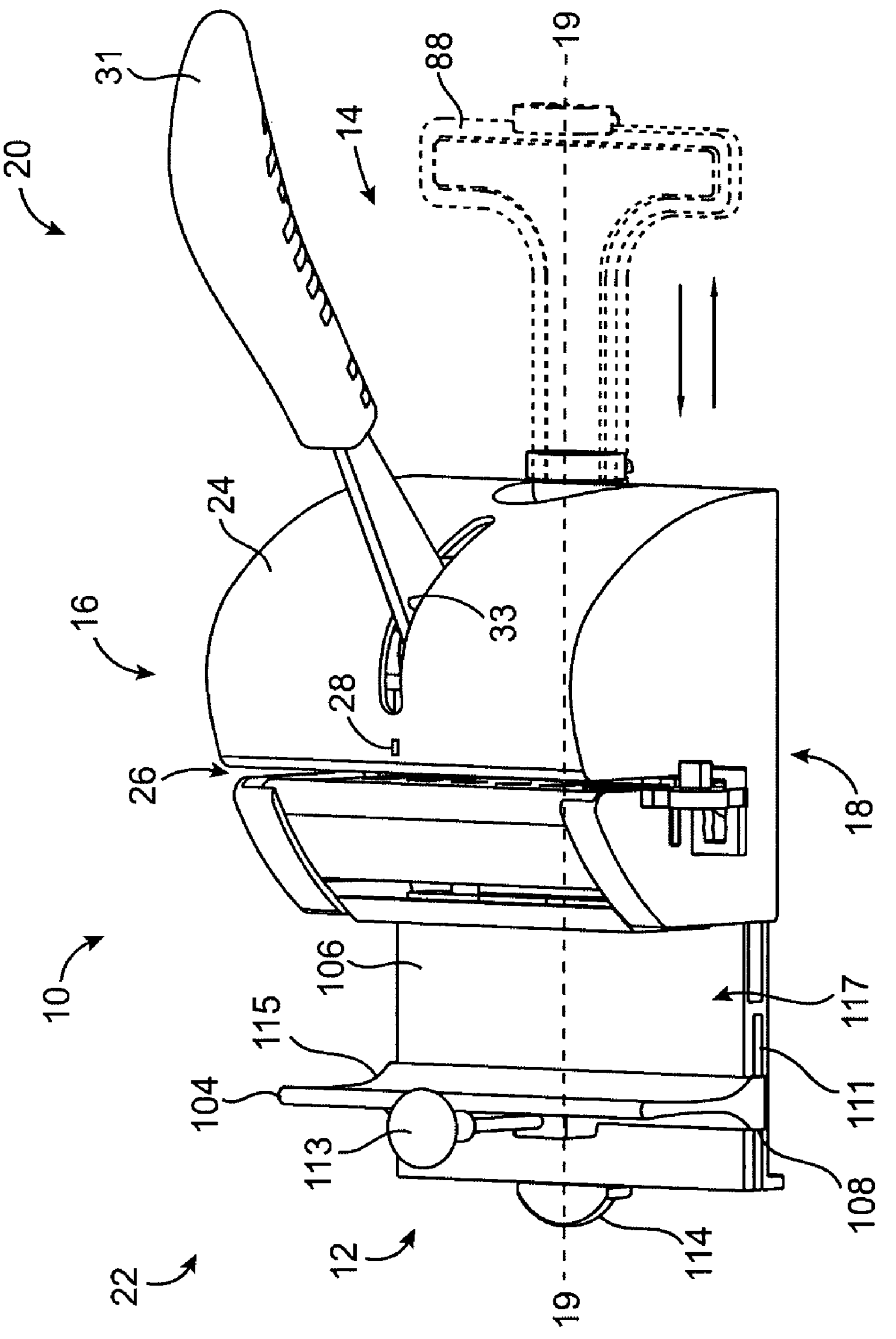
FIG. 2 is a top perspective view of the preferred embodiment of the binding apparatus.

In FIGS. 1 and 2, the preferred embodiment of the apparatus 10 comprises a hole punching mechanism 20 and a binding mechanism 22, both of which are included in one easily portable machine 10. The hole punching mechanism 20 is configured to punch a consistent pattern of holes through a variety of different paper materials, including thinner sheets of paper that serve as the inner pages or sheets of a book, as well as thicker cardboard materials, such as chipboard, that serve as the cover or cover pages of a book. Throughout this specification, "cover" and "cover page" shall be used interchangeably to refer to the same thing. The apparatus 10 comprises a front end 12, a rear end 14, a first side 16 and a second side 18. The apparatus 10 also defines an axis 19.

The hole punching mechanism 20 includes a main casing 24 which defines a vertical slot 26 for receiving the paper materials to be hole punched. In particular, the slot 26 is defined by opposing vertical walls 23, 25. In the preferred embodiment, the slot 26 extends substantially vertically to receive paper materials which are then punched through horizontally as described below. A center punch marking 28 is positioned on top of the casing 24 at a precise location adjacent to the slot 26 to indicate a centering position to the user.

Figure 3:
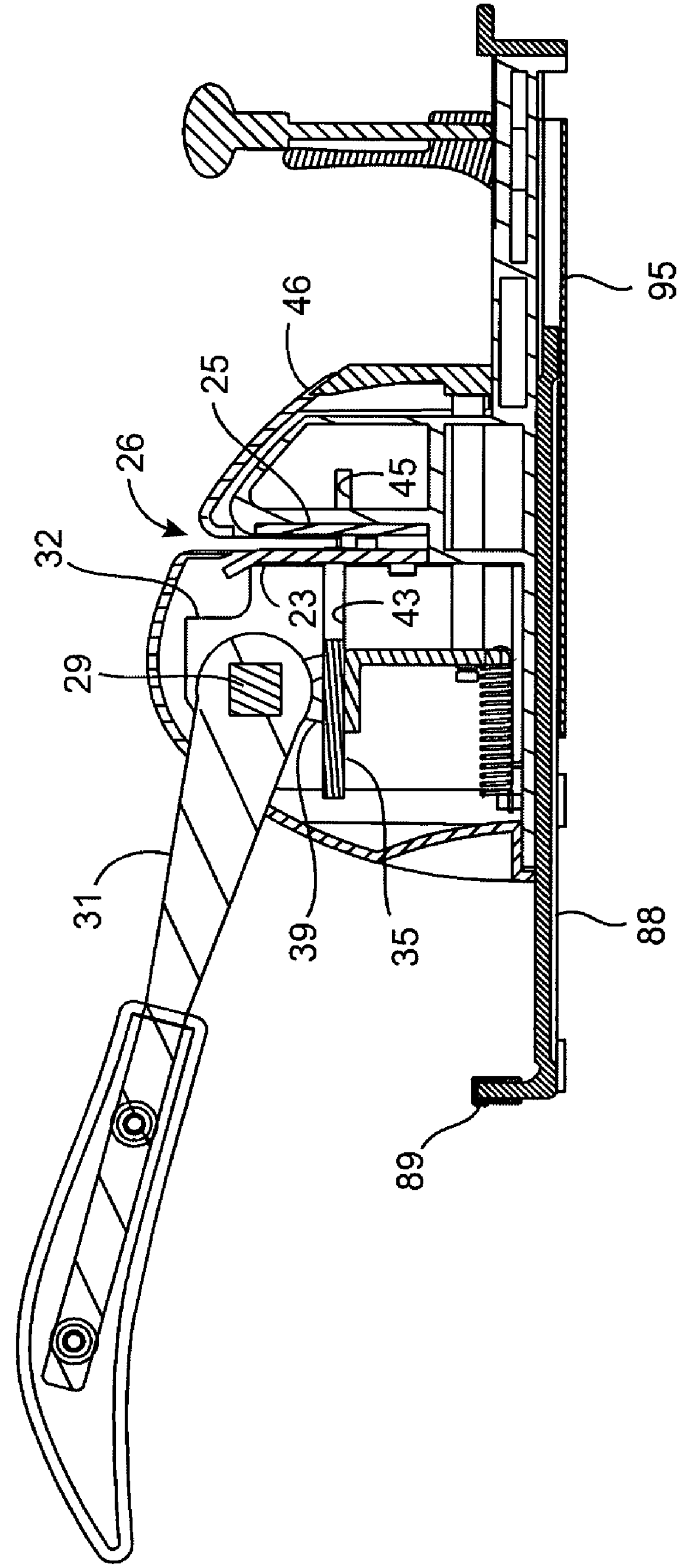
FIG. 3 is an axial cross-sectional view of the preferred embodiment of the binding apparatus.
Figure 4:
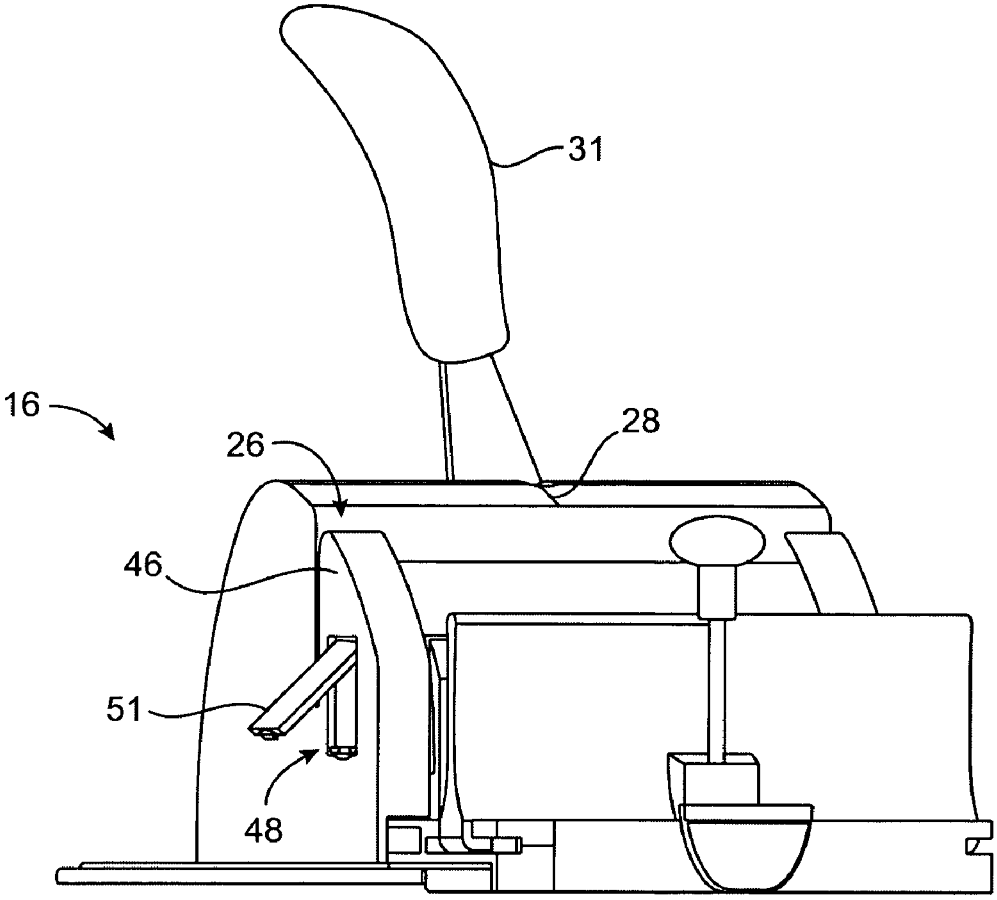
FIG. 4 is front perspective view of the preferred embodiment of the binding apparatus.
Figure 5:
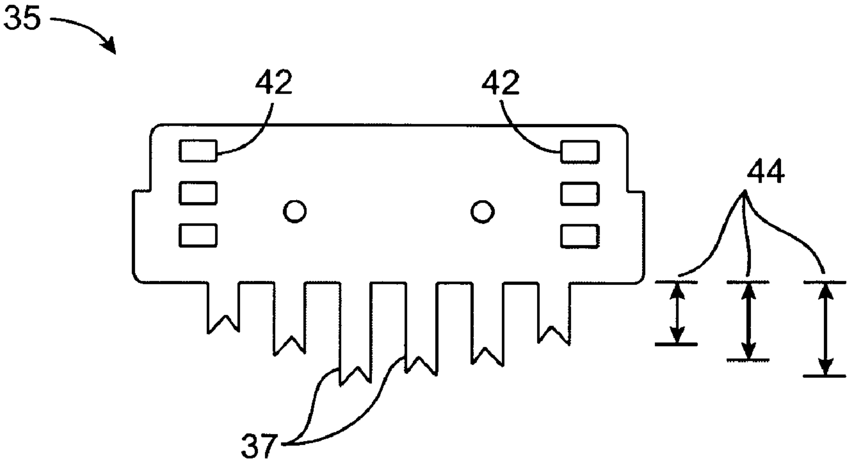
FIG. 5 is a top plan view of a graduated punch die.

In FIGS. 3-5, a manually operable actuator 31 exits a rear slot 33 of the casing 24. The actuator 31 preferably comprises a lever 31 that is biased to a position that corresponds to a default open configuration of the slot 26 for receiving the materials to be punched. In the illustrated embodiment, the lever 31 is preferably spring biased to an upper position that corresponds to the open default position of the hole punching mechanism 20. A shaft 29 couples the lever 31 to a frame 32 within the main casing 24.

The actuator 31 is coupled to a graduated punch die 35, illustrated in top plan view in FIG. 5, which comprises a plurality of punch teeth 37. In the preferred embodiment, each punch tooth 37 comprises a rectangular profile so as to punch rectangular holes, though it is to be expressly understood that the punch teeth may be configured with any desired geometric profile such as circles, ovals, etc. In the preferred embodiment shown in FIG. 3, the actuator 31 is coupled to the punch die 35 with a pair of driving gears 39 that engage sockets 42 in the die 35. Accordingly, downward force on the actuator 31 (shown as counterclockwise rotation in the illustrated embodiment in FIG. 3) rotates the gears 39 which causes the punch die 35 to move axially forward toward and through the materials in the vertical slot 26. It is to be expressly understood that the preferred lever 31 is simply one of many ways to actuate the punch die 35 to punch through the paper materials, and that many other mechanisms may be employed to accomplish the same.

As shown in FIG. 3, the punch die 35 travels horizontally through a first channel 43 defined by the frame 32 before reaching the vertical slot 26. The punch die 35 continues to travel through openings in both vertical slot walls 23, 25 aligned with the channel 43 into a second channel 45 defined in a forward casing portion 46. Thus, the first channel 43, openings in both vertical slot walls 23, 25 and the second channel 45 collectively form a horizontal passageway for the punch die 35 to move in a reciprocating manner upon engagement and release of the actuator 31.

In FIG. 5, the punch die 35 preferably comprises a graduated, or staggered, configuration wherein the teeth 37 have varying lengths 44 such that the teeth 37 do not all penetrate the paper materials at the same time. By alternating or staggering the lengths of the teeth 37, the teeth 37 penetrate the materials at different times. For example, in the illustrated embodiment in FIG. 5 which comprises six individual teeth 37, the teeth 37 are graduated such that no more than two teeth 37 penetrate the materials at one time. It will be appreciated that this reduces the amount of force necessary to operate the actuator 31 (shown in FIGS. 1-4) to penetrate the materials to be punched. As an example and not by way of limitation, the range of force necessary to penetrate the following materials comprise the following ranges:

0.5 pounds to 5 pounds for thinner sheets of regular paper; and 2.0 pounds to 25 pounds for thicker materials, such as cardboard, chipboard and other thick materials commonly used as book or notebook covers.

This is particularly helpful when the materials to be punched are thick, such as cardboard, or when several inner pages of the book are to be punched at one time. It will further be appreciated that the easy-to-punch feature makes the machine 10 particularly adapted to children and the elderly and others who are involved in arts and crafts.

In FIGS. 3 and 4, the forward casing portion 46 that defines a waste compartment 48 for receiving punch "holes," or the punched through pieces. A door 51 is provided on the forward casing portion 44 preferably at a first side 16 of the hole punching mechanism 20 for accessing and disposing the waste contents of the compartment 48.

Figure 6A:
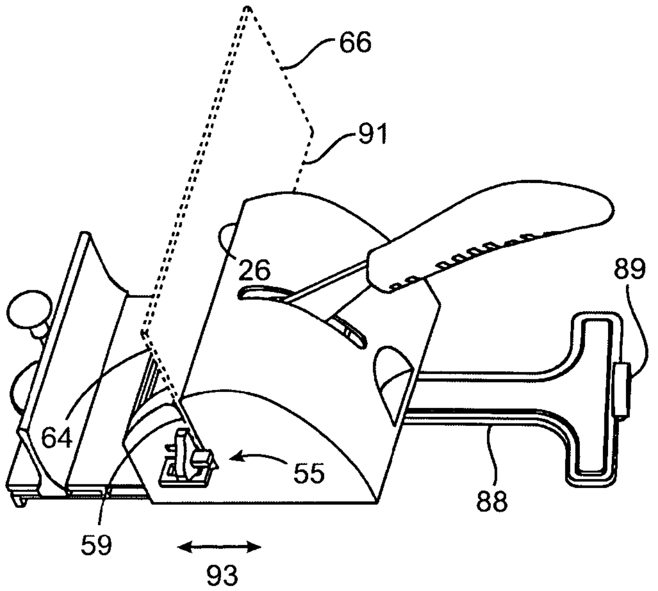
FIG. 6A is a perspective view of the preferred apparatus showing a cover page aligned with a preferred guide.

A guide, or stop, 55 of particular interest to the invention is illustrated in FIGS. 6A-C, 7A-C and 8A-C. In FIG. 6A, the guide 55 placed at a second side 18 of the hole punching mechanism 20, opposite to the first side 16 and adjacent to a second side exit 59 of the slot 26. The guide 55 preferably provides three different positions depending upon the materials and the type of punching desired.

Figure 6B:
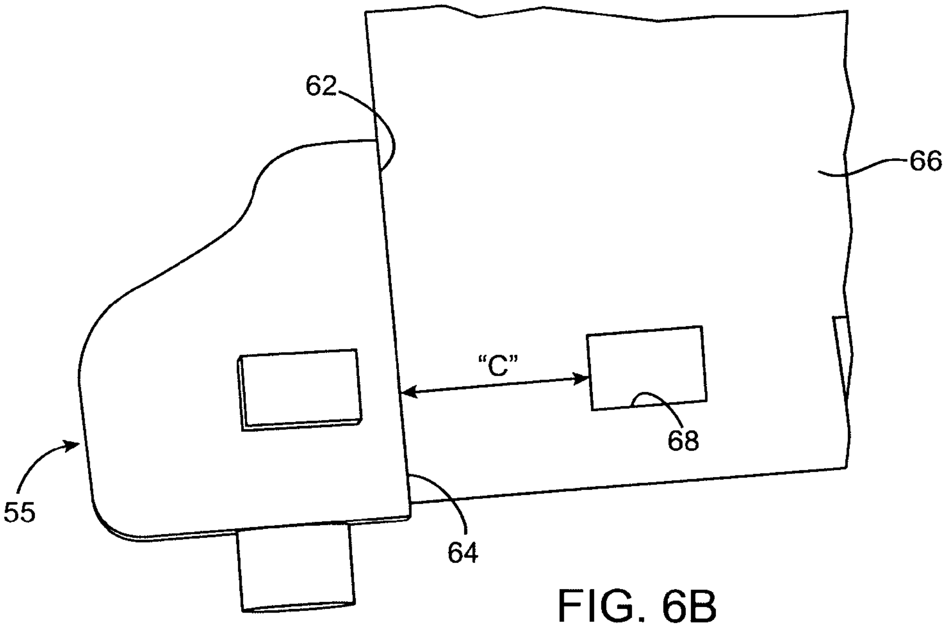
FIG. 6B is a front elevation view of the cover page aligned with the preferred guide.
Figure 6C:
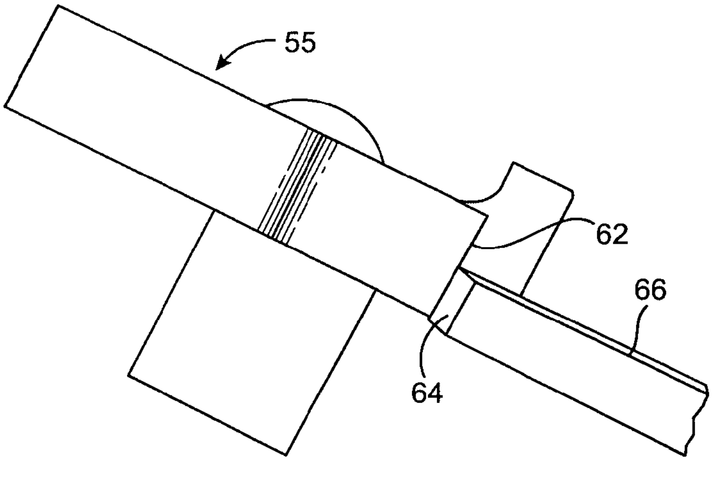
FIG. 6C is a top plan view of the cover page aligned with the preferred guide.

For outer covers or cover pages of a journal notebook, the guide 55 comprises a first vertical guide surface, or cover page surface, 62 that provides a first position, or cover page position, for abutting the edges of such cover materials as shown in FIGS. 6A-C. The cover page surface 62 is positioned such that a relatively longer distance "A" of unpunched space extends from an abutting edge 64 of the cover page 66 to the nearest punched hole 68.

Figure 7A:
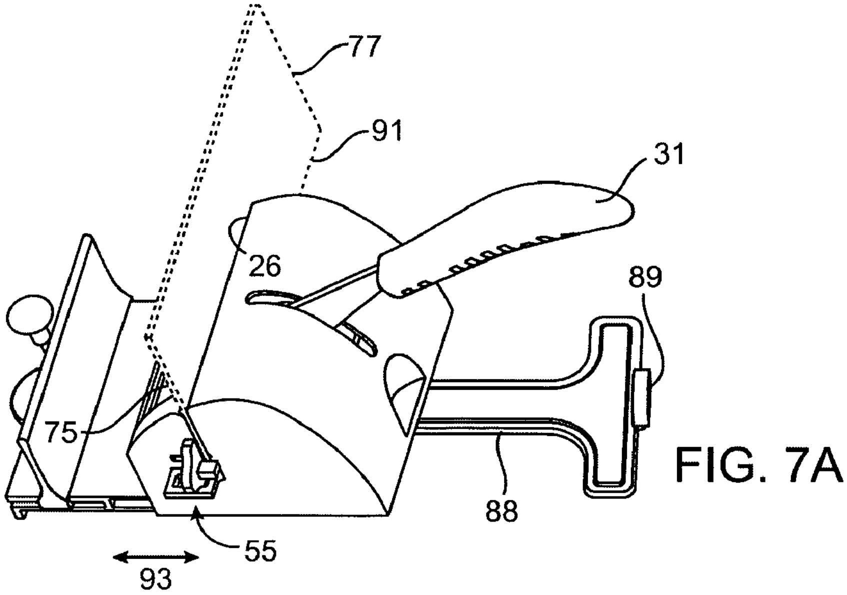
FIG. 7A is a perspective view of the preferred apparatus showing an inner page aligned with a preferred guide.
Figure 7B:
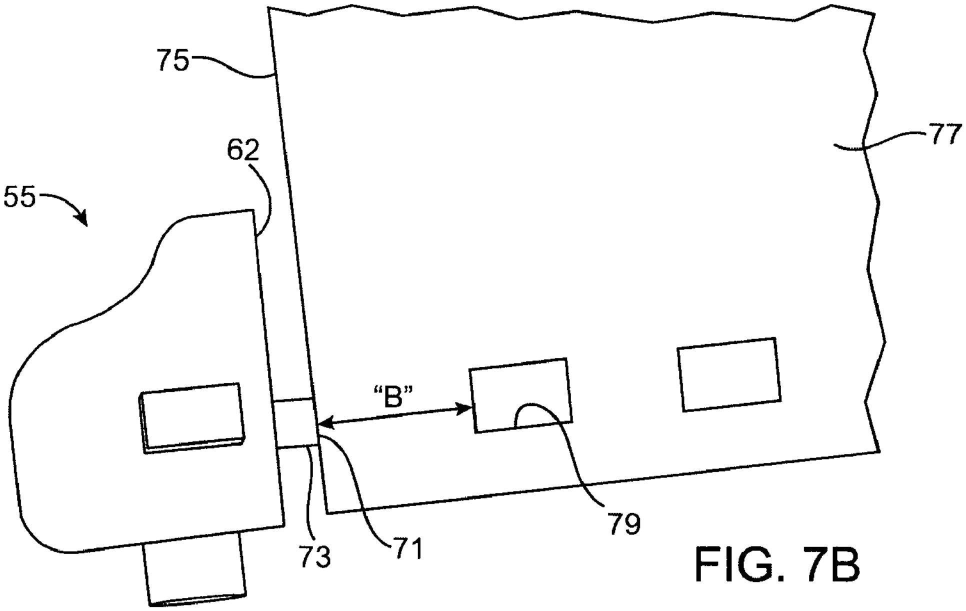
FIG. 7B is a front elevation view of the inner page aligned with the preferred guide.
Figure 7C:
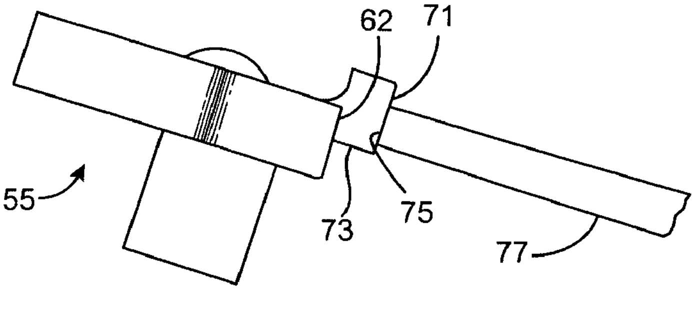
FIG. 7C is a top plan view of the inner page aligned with the preferred guide.

In FIGS. 7A-C, the guide 55 also includes a second vertical surface, or inner page surface, 71 that provides a second position, or inner page position, for abutting the edges of inner pages. In the preferred embodiment, the inner page surface 71 is included on a medial tab 73 that is located medially, or inwardly, with respect to the cover page surface 62. Accordingly, this inner page surface 71 is positioned such that a relatively shorter distance "B" of unpunched space extends from an abutting edge 75 of the inner page 77 to the nearest punched hole 79. Alternatively stated, the cover page surface 62 of the guide 55 is located lateral to the inner page surface 71 such that the cover page surface 62 provides a longer distance of unpunched space A on cover pages than the unpunched space B on inner pages provided by the inner page surface 71. When the cover pages and inner pages are bound as discussed further below, it will be appreciated that the different spacing provided by the guide 55 results in cover pages that extend over the top and bottom of inner pages to form a book.

Figure 8A:
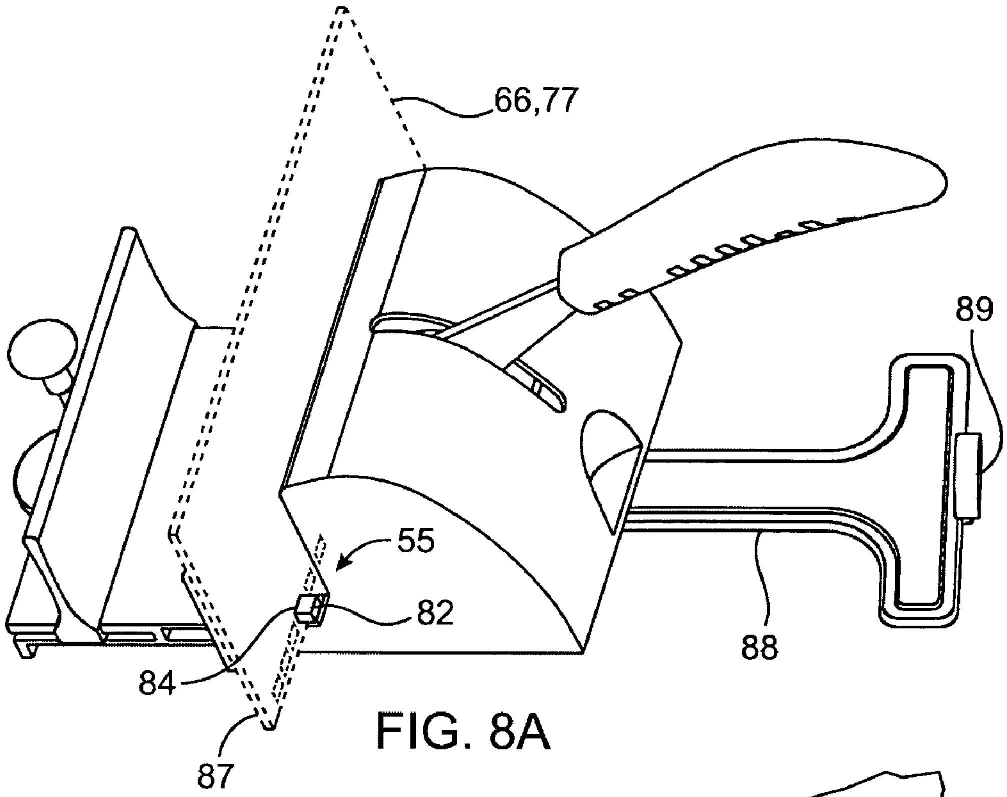
FIG. 8A is a perspective view of the preferred apparatus showing a cover page or inner page aligned with the continuous punch feature of the guide allowing exact continuation of punch holes.
Figure 8B:
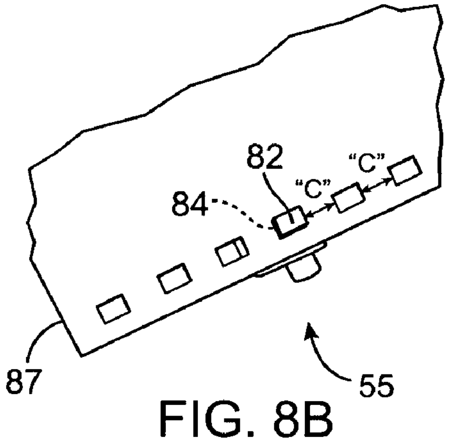
FIG. 8B is a front elevation view of the cover page or inner page aligned with the continuous punch feature of the preferred guide.
Figure 8C:
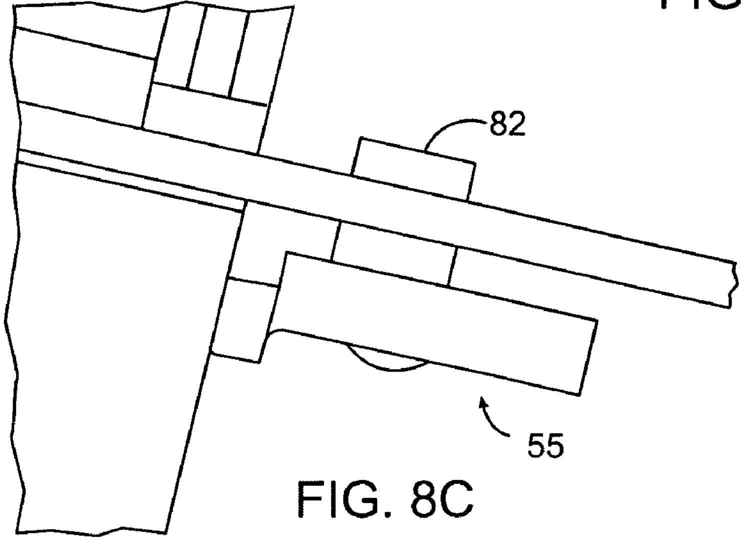
FIG. 8C is a top plan view of the cover page aligned with the continuous punch feature of the preferred guide.

In FIGS. 8A-C, the guide 55 also includes a rearwardly extending projection, or continuous punching projection, 82 that provides a third position, or continuous punching position. The continuous punching projection 82 has a profile that conforms to the profile of the punch teeth 37 (shown in FIG. 5), shown here as rectangular in the preferred embodiment, so as to be able to fit, or inserted, into a punched hole 84 of the material, whether it be cover pages or inner pages, where additional holes are desired. In particular, the continuous punching projection 82 is positioned precisely such that when it is inserted into a previously punched hole 84, a consistent pattern of holes is punched with equal amount of space "C" between adjacent punched holes 86. The position of the continuous punching projection 82 is also such that the punch teeth 37 will precisely transverse through any previously punched holes without enlarging, or otherwise modifying, said holes.

In the illustrated embodiment where the punch die 35 comprises six punch teeth 37 as shown in FIG. 5, the consistent pitch is accomplished by inserting the projection 82 into the fourth (previously punched) hole 84 from the edge 87, or from the fourth hole from a previously punched set of holes. This results in a new set of six additional holes being punched where the pitch between all of the resulting holes are equal, thereby creating a unitary, consistent pattern of holes throughout the entire cover page and/or inner pages.

In FIGS. 3, 6A, 7A and 8A, a slidable stabilizer arm 88 may be horizontally extended from the rear of the apparatus 10 to provide additional leverage and stability when engaging the hole punching mechanism 20. The stabilizer arm 88 includes a vertical ledge 89 to facilitate pulling and pushing. When not in use, the stabilizer arm 88 may be slid back into a bottom casing 95 shown in FIG. 3.

Figure 9:
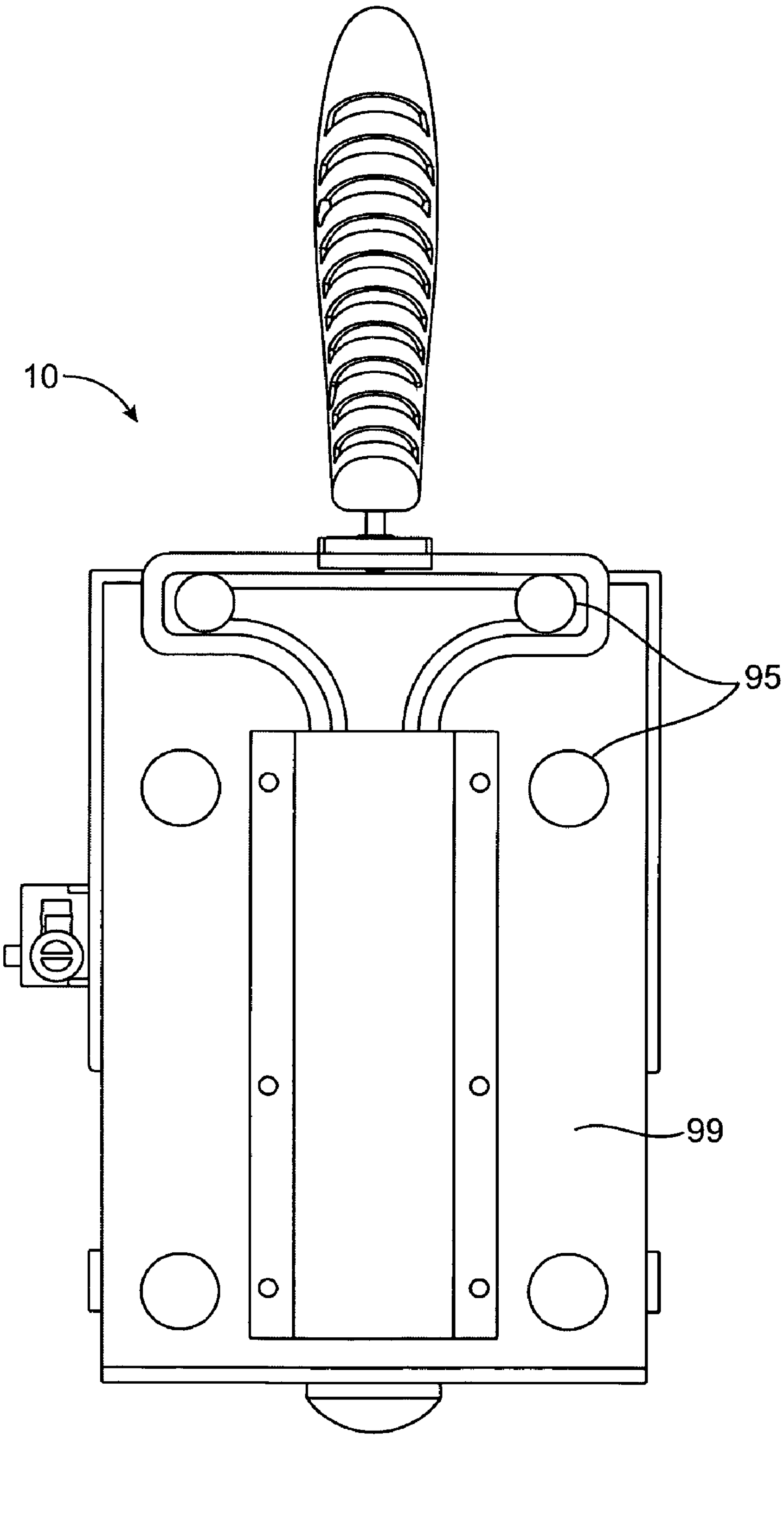
FIG. 9 is a bottom plan view of the preferred embodiment of the apparatus.

The apparatus 10 may also comprise non-slip pads, or feet, 95 on a bottom surface 99 as shown in FIG. 9 to provide extra traction and stability.

With the preferred structures of the hole punching mechanism 20 described, turn now to its preferred operation as shown in FIGS. 6A, 7A, 8A and 10. A user will initially select either a cover page 66 as shown in FIG. 6A, generally composed of thicker cardboard material, or one or more inner pages 77 as shown in FIG. 7A, generally composed of thinner sheets of paper. The material 66, 77 is then inserted downwardly into the vertical slot 26 with the portion 91 to be punched positioned at the bottom of the slot 26. The punch guide 55 is axially adjusted, as shown by the bi-directional arrow 93 such that the appropriate surface 62, 71 of the guide 55 is aligned with the slot 26, or more specifically, with the paper/book material 66, 77 inserted into the slot 26.

For cover pages as shown in FIG. 6A, the guide 55 is axially adjusted such that the cover page guide surface 62 is aligned with the cover page 66 inserted into the slot 26. The cover page 66 is moved horizontally until its top or bottom edge 64, as the case may be, abuts the cover page guide surface 66. For inner pages as shown in FIG. 6B, the guide 55 is axially adjusted such that the inner page surface 71 of the medial tab 73 is aligned with the inner page 77 inserted into the slot 26. Since inner pages 77 tend to be thinner, a stack of inner pages 77 may be inserted into the slot 26 as punched at one time. The inner page, or a stack of pages, 77 is moved horizontally until its top or bottom edge 75, as the case may be, abuts the inner page surface 71.

With the paper material 66, 77 inserted and properly aligned, a user may then simply push the lever 31 downward to cause the punch die 35 to traverse horizontally, thereby causing the punch teeth 37 to punch holes through the material 66, 77. In the preferred embodiment, the punch teeth 37 do not all puncture the material 66, 77 at the same time, but rather through a graduated, alternating configuration so as to lessen the amount of force necessary to exert down on the lever 31. This is particularly helpful when very thick materials, which typically serve as covers to journal notebooks, are being hole punched. To the extent that a greater amount of force needs to be exerted on the lever 31, the stabilizer arm 88 may be slid out from the rear 14 of the apparatus to provide extra leverage and prevent the apparatus 10 from tilting.

Figure 11:
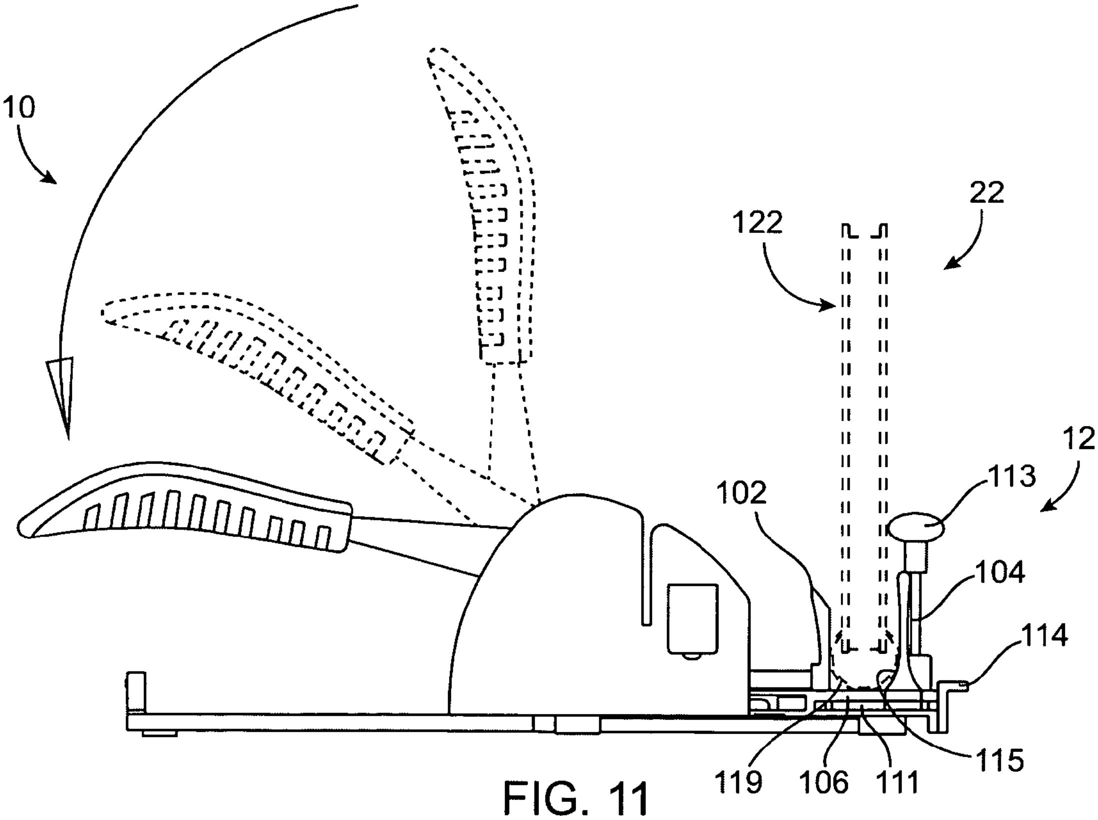
FIG. 11 is a side elevation view of the preferred embodiment of the apparatus illustrating a preferred binding mechanism in operation.

In FIG. 11, the apparatus 10 also comprises the binding mechanism 22 so as to form a dual function machine 10 that combines hole punching with binding so as to provide all the necessary tools for the individual user to make a journal notebook. The binding mechanism 22 comprises a vertical inner vise wall 102 and a vertical outer vise wall 104. In the preferred embodiment, the outer vise wall 104 is horizontally movable with respect to the inner vise wall 102. Alternatively, the inner vise wall 102 may be made movable with respect to the outer vise wall 104, or both walls 102, 104 may be made horizontally movable.

In FIGS. 1, 2 and 11, the outer vise wall 104 is coupled to a floor 106. In the preferred embodiment, the outer vise wall 104 includes side runners 108 that can slide axially within side tracks 111 of the floor 106 such that the outer vise wall 104 is axially slidable with respect to the floor. It is to be expressly understood that a variety of mechanisms may be utilized to cause the outer vise wall 104 to be axially movable with respect to the floor 106 and the inner vise wall 102. A handle 113 preferably in the form of a knob is coupled to the outer vise wall 104 facilitates manual operation. The handle 113 is coupled to a shaft 114 threaded at the bottom end. By tightening the knob 113, the shaft 114 is secured to the floor 106, thereby securing the outer vise wall 104 once the outer vise wall 114 is slid to the desired position along the floor 106. A vise stopper 114 is also provided at the front end 12 of the apparatus 10.

The outer vise wall 104 preferably includes a bottom portion 115 that is curved, or flared, towards the inner vise wall 102 to facilitate compression of the circular binding wire as discussed below. The outer vise wall 104, inner vise wall 102 and floor 106 collectively form an opening, or binding channel, 117 for receiving books partially assembled with binding rings or binding wire.

In operation as shown in FIG. 11, a user first threads a binding material 119, such as double wire binding ring combs, through the holes punched in the covers and inner pages to form a partially assembled journal book 122. The book 122 is then placed into the opening 117 with the binding wire 119 downward and resting on the floor 106. The user then moves the outer vise wall 104 inward towards the inner vise wall 102 so as to compress the binding wire 119, thereby completing assembly of the book 122. In the preferred embodiment, the necessary force to move the outer vise wall 104 so as to compress the binding wire comprises a range of 0.5 pounds to 10 pounds.

The mobility of the outer vise wall 104 with respect to the inner vise wall 102 not only accomplishes the compression of binding materials, but also provides for adjustability to receive differently sized binding wires. Therefore, in the preferred embodiment, the outer vise wall 104 may be adjusted to and from the inner vise wall 102 to receive binding wires having diameters ranging, for example, from 0.5 inches to 2 inches.

Accordingly, it will be appreciated that what was once accomplished with at least two heavy duty machines in an industrial manufacturing setting is now accomplished with a single, dual function machine for non-industrial use (e.g., at home). Furthermore, the dual functions of hole punching and wire binding is combined into a small, compact machine 10 that is easily portable so that hobbyists can carry the machine 10 to any particular destination and, for example, gather together with other arts and crafts enthusiasts with their own machines 10.

Figure 10:
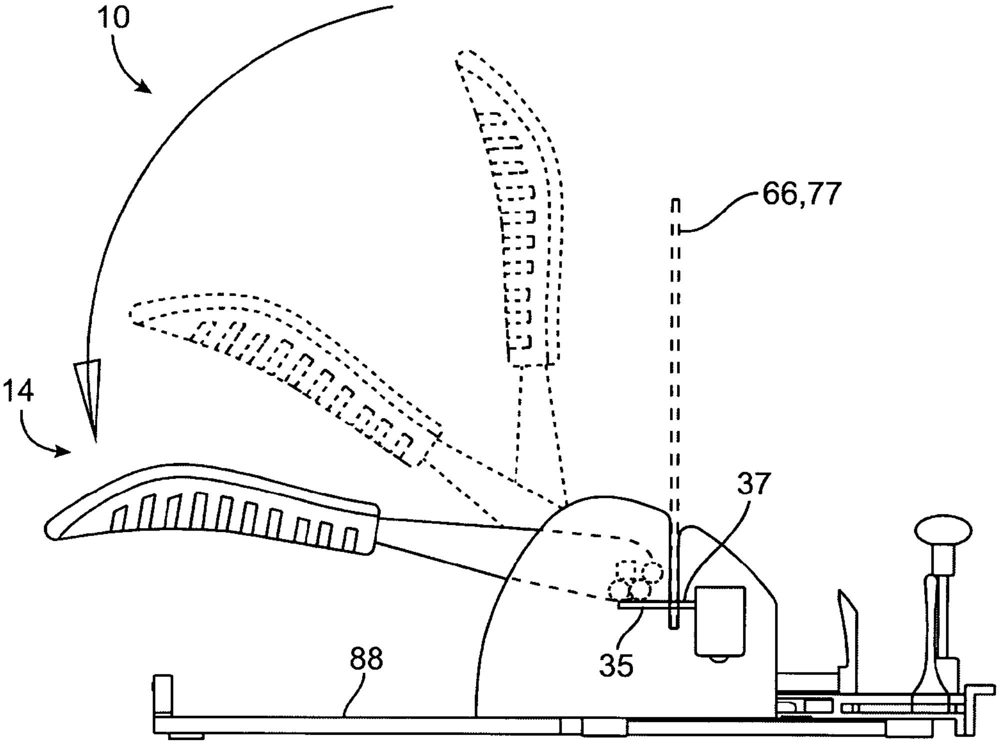
FIG. 10 is a side elevation view of the preferred embodiment of the apparatus illustrating a preferred hole punching mechanism in operation.

As examples and not by way of limitations, the ranges of the miniature size of the preferred embodiment of the apparatus 10 include the following. The apparatus 10 has a height in the range of 2 inches to 8 inches, with a preferred height of 3 to 4 inches, when the lever 31 is in a fully depressed position as shown in FIG. 10, which is the preferred configuration for storage. With the lever 31 in the fully upright position, the machine 10 preferably has a height up to 18 inches. The apparatus 10 also has a width in the range of 2.5 inches to 12 inches, with a preferred width of 4 to 5 inches. With the stabilizing bar in the stowed position and not considering the lever 31, the apparatus 10 has a length in the range of 4 inches to 10 inches, with a preferred length of 6 to 7 inches. Full extension of the stabilizing arm 88 and/or full depression of the lever may add another 2 to 7 inches to the rear of the main casing 24. Thus, it will be appreciated that the above preferred ranges of dimensions of the apparatus 10 further facilitate ease of use and portability thereof.

Figure 12:
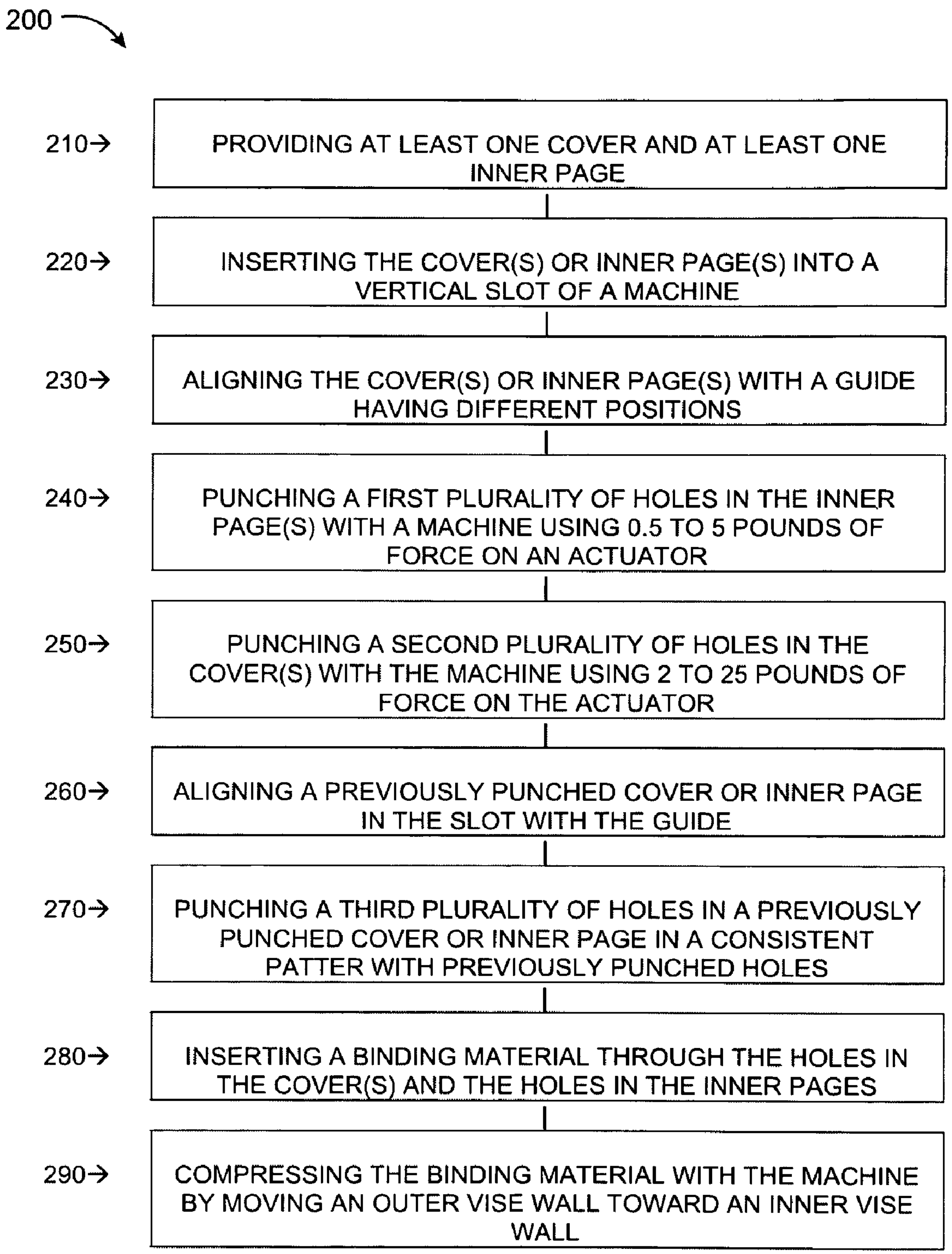
FIG. 12 is a diagram of a preferred method for making a journal notebook with a single machine.

FIG. 12 illustrates a preferred method 200 for making a journal notebook with a single machine. The method 200 comprises step 210 of providing at least one cover and at least one inner page, or sheet.

Step 220 comprises inserting the covers or inner pages into a vertical slot in the machine. Covers tend to be composed of thicker materials such as chipboard, whereas inner pages tend to be composed of thinner materials. Accordingly, step 220 preferably comprises inserting one cover at a time into the vertical slot. Since inner pages are generally thinner, step 220 may comprise inserting one inner page or a stack of multiple inner pages at one time into the vertical slot.

Step 230 comprises aligning the covers or inner pages with a guide providing different positions, namely, a cover position, an inner page position, and a continuous punch position. In step 240, a first plurality of holes is punched into the inner page(s) with the machine using a force in the preferred range of 0.5 to 5 pounds on an actuator, such as a lever. Step 250 comprises punching a second plurality of holes into the cover(s) with the machine using the preferred range of 2.0 to 25 pounds on the actuator.

In the preferred embodiment, the number of holes punched into the material in a single actuation of the hole punching mechanism depends upon the number of punch teeth formed on the punch die (e.g., 6 punch teeth on a punch die will equate to 6 holes punched in one instance). It is anticipated that users will want to make journal notebooks with covers and pages that require more holes than the maximum capacity provided by the machine with a single exertion. This may be required particularly when making a journal with large pages and covers that require more holes than be punched at one time with the punching mechanism of the apparatus.

Accordingly, the method 200 also enables a user to continuously punch holes through a previously punched cover or inner page to form a continuous pattern of holes with equal spacing between all the holes punched. Step 260 comprises aligning a previously punched cover or inner page in the slot with the guide. In step 160, the previously punched cover or inner page is positioned such that a previously punched hole receives a projection on the guide. This properly aligns the previously punched cover or inner page for the additional punching in step 270.

In step 270, a third or additional plurality of holes is punched into the previously punched cover or inner page. With the proper alignment in step 260, the resulting additional holes punched in step 270 will form a continuous pattern with the previously punched holes so that equal and consistent spacing is provided between all the holes punched.

Step 280 comprises inserting a binding material, such as binding wire or binding rings, through the first plurality of holes and second plurality of holes so as to partially assembly the covers to the inner pages. In the preferred method, double wire binding ring combs are inserted through the punched holes. Step 290 comprises compressing the binding material with a binding mechanism of the machine. In step 290, an outer vise wall is moved horizontally toward an inner vise wall to compress the binding material, and thus complete assembly of the journal notebook.

The preferred method 200 enables an individual to accomplish what formerly could only be done at a factory using multiple machines. Not only does the method 200 enable the individual user to make a journal notebook with a single machine, it does so by only requiring certain ranges of force well within human capacity.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

What is claimed is:

1. A journal notebook binding apparatus adapted for non-industrial use, comprising:
- a hole punching mechanism including:
  - a plurality of punch teeth spread along a first direction,
  - an actuator to move the punch teeth; and
- a guide providing a plurality of different punching positions substantially along the first direction, wherein the guide comprises a continuous punching projection configured to be inserted into a previously punched hole thereby providing a position for continuous punching.

2. The apparatus of claim 1, wherein each tooth comprises a rectangular profile.

3. The apparatus of claim 1, wherein the actuator moves the punch teeth in a substantially horizontal direction.

4. The apparatus of claim 1, wherein the plurality of punch teeth are in a graduated configuration and punch the journal notebook sequentially in pairs starting in the center and ending at the ends of the graduated configuration.

5. The apparatus of claim 1, wherein the plurality of different punching positions comprise a first position for punching inner pages and a second position for punching outer covers, wherein the first position and the second position are separated by a fixed length substantially along the first direction.

6. The apparatus of claim 1, further comprising a stabilizer extension arm.

7. The apparatus of claim 1, further comprising a binding mechanism having a horizontally movable vise wall.

8. The apparatus of claim 1, wherein the actuator comprises a lever biased to an open position.

9. A journal notebook binding apparatus adapted for non-industrial use, comprising:
- a hole punching mechanism including:
  - a main casing having a height less than 8 inches;
  - a plurality of punch teeth spread along a first direction; and
  - an actuator to move the punch teeth simultaneously;
- a guide for positioning journal notebook materials to be punched, the guide providing a plurality of different punching positions substantially along the first direction, the guide being adjustable along the first direction, the guide comprising a continuous punching projection configured to be inserted into a previously punched hole thereby providing a position for continuous punching; and
- a binding mechanism including a horizontally movable vise wall.

10. The apparatus of claim 9, wherein the guide is configured to provide a first position, a second position and a third position for the objects to be punched.

11. The apparatus of claim 9, wherein the actuator moves the punch teeth in a substantially horizontal direction.

12. The apparatus of claim 9, wherein each tooth comprises a rectangular profile.

13. The apparatus of claim 9, wherein the plurality of punch teeth are included in a punch die in a bi-graduated configuration, and pairs of teeth in a center of the graduated configuration have a longer length than separated pairs of teeth at ends of the graduated configuration.

14. The apparatus of claim 9, wherein the hole punching mechanism comprises a manual lever for moving the plurality of punch teeth.

15. The apparatus of claim 14, wherein the hole punching mechanism is adapted to penetrate the journal notebook materials with manual force applied to the lever in the range of 0.5 pounds to 25 pounds.

16. The apparatus of claim 9, further comprising a stabilizer extension arm.

17. A method for making a journal notebook at home with a single machine, comprising:

providing at least one cover and at least one page;

providing a hole punching mechanism having a plurality of punch teeth along a first direction in a graduated configuration wherein teeth in a center of the graduated configuration have a longer length than the teeth at ends of the graduated configuration;

adjusting a guide along the first direction to position the at least one cover;

punching a first plurality holes in the at least one cover with the machine, the first plurality of holes having first distances, along a spreading direction of the first plurality of holes, to an edge of the at least one cover;

adjusting the guide along the first direction to position the at least one page;

punching a second plurality of holes in the at least one page that align with the first plurality of holes in the at least one page and form a continuous pattern with the first plurality of holes, the second plurality of holes having second distances, along a spreading direction of the second plurality of holes, to an edge of the at least one page corresponding to the edge of the at least one cover, the second distances being different from the first distances;

inserting a binding material through the first plurality of holes and the second plurality of holes; and compressing the binding material with the machine, wherein all of the plurality of teeth are used in combination to punch all of the first plurality of holes and the second plurality of holes.

18. The method of claim 17, wherein:

punching the first plurality holes in the at least one cover comprises horizontally punching the first plurality holes in the at least one cover; and punching the second plurality of holes in the at least one page that align with the first plurality of holes in the at least one page comprises horizontally punching the second plurality of holes in the at least one page.

19. The method of claim 17, wherein:

compressing the binding material comprises moving a vise wall horizontally.

20. The method of claim 17, wherein:

punching the first plurality holes in the at least one cover comprises manually pushing a lever with a force between 5 pounds and 25 pounds.

21. The method of claim 17, wherein:

punching the second plurality of holes in the at least one page that align with the first plurality of holes in the at least one page comprises manually pushing a lever with a force between 1 pound and 5 pounds.

22. The method of claim 17, wherein the first plurality of holes comprise a first pattern, the method further comprising:

punching a third plurality of holes in the at least one cover that is consistent with the first pattern.

23. The method of claim 17, wherein the second plurality of holes comprise a first pattern, the method further comprising:

punching a third plurality of holes in the at least one page that is consistent with the first pattern by first inserting a projection into one of the second plurality of holes.

24. The apparatus of claim 1, wherein only a maximum of two teeth punch holes at a given time.

25. The apparatus of claim 1, wherein all of the plurality of teeth are actuated simultaneously.

26. The apparatus of claim 1, wherein the teeth are paired in the graduated configuration, where the paired teeth in the center of the graduated configuration have a length longer than pairs of teeth at the ends of the graduated configuration.

* * * * *